(12) United States Patent
Loureiro Benimeli

(10) Patent No.: US 8,528,931 B2
(45) Date of Patent: Sep. 10, 2013

(54) DEVICE FOR TRANSPORTING SHOPPING

(76) Inventor: Fermin Jaime Loureiro Benimeli, Barcelona (ES)

( * ) Notice: Subject to any disclaimer, the term of this patent is extended or adjusted under 35 U.S.C. 154(b) by 0 days.

(21) Appl. No.: 13/144,219

(22) PCT Filed: Jan. 14, 2010

(86) PCT No.: PCT/ES2010/070016
§ 371 (c)(1),
(2), (4) Date: Aug. 11, 2011

(87) PCT Pub. No.: WO2010/081927
PCT Pub. Date: Jul. 22, 2010

(65) Prior Publication Data
US 2011/0291390 A1    Dec. 1, 2011

(30) Foreign Application Priority Data
Jan. 14, 2009 (ES) ................ 200900082 U

(51) Int. Cl.
*B62B 3/02* (2006.01)
(52) U.S. Cl.
USPC ....... 280/655; 280/DIG. 3; 280/639; 280/651
(58) Field of Classification Search
USPC ............. 280/37, 30, 35, 47.26, 47.33, 47.19, 280/42, 47.24, 644, DIG. 3, 652, 654, 651
See application file for complete search history.

(56) References Cited

U.S. PATENT DOCUMENTS

| 4,659,096 A * | 4/1987 | Leimgruber ............... 280/39 |
| 2002/0096862 A1* | 7/2002 | Fang ............... 280/652 |
| 2011/0291390 A1* | 12/2011 | Benimeli ............... 280/655 |

FOREIGN PATENT DOCUMENTS

| DE | 8906706 | 7/1989 |
| DE | 102007002099 | 7/2008 |
| ES | 1012233 | 7/1990 |
| ES | 1056725 | 5/2004 |
| WO | WO-03049986 | 6/2003 |

* cited by examiner

*Primary Examiner* — John Walters
*Assistant Examiner* — James Triggs
(74) *Attorney, Agent, or Firm* — Leason Ellis LLP

(57) ABSTRACT

The invention relates to a device comprising: a foldable case provided with a base having at least two folding side wheels for supporting and moving same and side panels which can be moved between a folded-up position, in which the panels are positioned in parallel on top of the base, and an unfolded position, in which the panels are arranged substantially vertically, forming together with the base a cavity in which shopping can be placed; and a telescopic handle which is mounted on a support part solidly connected to the base by means of a hinge system which can be used to move the handle between a non-use position, in which the handle is arranged substantially horizontally on the folded-up case, and a use position in which the telescopic handle is arranged substantially vertically on the front side of the unfolded box.

19 Claims, 12 Drawing Sheets

DEVICE FOR TRANSPORTING SHOPPING

OBJECT OF THE INVENTION

The present invention refers to a device for transporting shopping.

ANTECEDENTS OF THE INVENTION

It is currently common practice for supermarkets and shopping centres to give clients plastic or paper bags for transporting acquired articles home.

The mass use of plastic bags for this purpose is a great source of concern to governments, ecological associations and the public in general, to the extent that legal initiatives are being developed to prohibit the consumption of plastic bags.

In addition, these plastic bags cause other problems when used, such as low resistance and the existence of batches with manufacturing defects, leading, with certain frequency, to the bags breaking and products acquired falling to the floor, especially when they are heavy articles, such as bottles or tins, or articles with sharp edges, such as cartons.

DESCRIPTION OF THE INVENTION

To solve the problem presented, the device for transporting shopping which is the object of this invention has been designed. It presents construction specificities aimed at enabling its use both in the shop, placing the products to be acquired inside, and to subsequently transport the shopping home. It provides sufficient consistency and rigidity to avoid damage to the shopping when transporting it in a normal way, and is foldable, which facilitates its transportation in a folded position and its reuse to avoid using a high number of bags.

Another objective of the invention is to enable the loading capacity to be adapted according to the amount of shopping to be carried out, doubling the capacity quickly and simply.

As a result, and in accordance with the invention, this device comprises: a foldable case provided with a base, with at least two folding side wheels for supporting and moving same and side panels, which can be moved between a folded-up position, in which the panels are positioned in parallel on top of the base, occupying minimum space, and an unfolded position, in which the panels are arranged substantially vertically, forming a cavity, together with the base, in which shopping can be placed, and a telescopic, extendible handle which is mounted on a support part solidly connected to the base by means of a hinge system, which can be used to move the handle between a non-use position, in which the handle is arranged substantially horizontally on the folded-up case, and a use position in which the telescopic handle is arranged substantially vertically on the front side of the unfolded box at the ideal height for the user to transport it comfortably.

The possibility of folding the case and the telescopic handle down into a non-use position, in which the handle is folded down horizontally on the folded case, considerably reduces the space occupied by the device in a non-use position and facilitates its transportation.

Furthermore, the arrangement of the folding side wheels at the base, which, when unfolded, provide more height at the base of the case, making it easier to place the shopping inside, enables the user to move the device comfortably into a use position, containing the shopping purchased, and then simply pull the handle in the necessary direction.

This device enables the user to place articles acquired directly into the interior of the foldable case to transport them comfortably, without the need to use plastic bags.

According to the invention, the support piece, on which the handle is situated, is longer than the height of the case in the folded position, leading the handle to be positioned horizontally on the folded case. In one use of the invention, the aforementioned support piece is fixed to the base, and, in a second use, it is defined in the very base of the case, and obtained from the same mould as the base.

In one use of the invention, the telescopic handle is arranged to go through a fixed or defined bridge section in the upper part of the front side of the case. Guiding the handle through this lateral section enables the telescopic handle to be stabilised in the vertical use position, on one hand, and, on the other hand, it makes it possible to move the handle between the horizontal and vertical positions as the user folds and unfolds the case.

The telescopic handle can have a single extendible arm, or can be an inverted "U" shape with two parallel extendible arms, providing, in this second case, a greater surface area and a more comfortable grip for the user.

In one use of the invention, the telescopic handle presents on its lower edge at least one stopper which moves down into the use position. In one use of the invention, the foldable sides of the case present holes or grooves to make the device lightweight, which reduce the quantity of material necessary to create the device, leading to a reduction in the total weight of the case and, therefore, greater comfort for the user when transporting the device.

In another use of the invention, the sides of the case present a continual surface area, without holes or grooves, and are made from a light, resistant material, preferably Polycarbonate.

The foldable case presents indentations and hooks on the side, at different heights, for an adjustable cover for the foldable case, by means of straps to support the cover.

The aforementioned cover is adjustable on the foldable case and comprises a handle for holding and transportation. In addition, in a preferred use, the aforementioned cover has a flap or central section with a zip to close the cover. This enables the cover to be closed to prevent products arranged inside the case from falling out, and to be opened to access the products.

This cover can be used to tidy and transport the device in the folded position. Due to the reusable nature of the cover, it is made preferably from a biodegradable textile material.

According to the invention, the panels of the foldable case present ledges in the higher part on which an additional foldable case, of a similar shape to the foldable case described above, can be supported and placed in a stable way. In a first use, the additional case comprises wheels and a telescopic handle which are similar to those on the foldable case. In a second use, the additional case comprises only the case itself, without wheels or a handle.

This additional case makes it possible to increase, and practically double, the capacity of the device, as it can be transported comfortably on top of the lower foldable case, provided with wheels and a handle for steering.

In addition, the arrangement of this additional case on the lower foldable case enables articles acquired to be higher up. This facilitates access to the articles, especially for older people.

In accordance with the invention, the wheels to transport the device are set on the base of the case, by means of supports, making it possible to fold them between a use position, substantially vertically, and a non-use position, in which they are folded horizontally on the base of the case, reducing the space occupied by the case in the folded or non-use position.

The platform or platforms in question comprise foldable stoppers to retain the supports holding the wheels in a use position, enabling the stoppers to unblock the supports to arrange the wheels gently and respectively into a flat, folded position at the base of the case.

In a variation of the use of the invention, foldable supports for the wheels are linked to springs which maintain them in a use position, substantially vertically, and actuating cables fixed to a manually operated actuator which can move on the lower part of the handle, to fold the supports into a non-use position.

This actuator has a button which acts on retractable pieces designed to fit into holes defined in the handle to fix the actuator in a non-use position of the supports. In this way, the foldable supports of the wheels are maintained in a use position due to the action of the springs, and, to position them in the non-use position, folded against the base of the case, it is simply a matter of moving the actuator to overcome the resistance of the springs and fixing the actuator in the adequate position by embedding the retractable pieces into the holes in the handle.

In a variation of use of the invention to that described previously, and in which the telescopic handle will have at least one stopper on the lower side to fold it towards the use position, the foldable handle presents appendages on the lower side which fit into holes defined in the supporting pieces, creating anchorage to retain the handle in a use position.

With the aforementioned features, the device can, in addition, incorporate battery-powered motorised means, for example with lithium battery, which act on the perimeter of one or both wheels, helping the user pull the device to move it. These motorising means can have a sensor to drive the device once the user starts to move, and to cease when the user stops pulling the device.

In a variation of use, the supports of the wheels have foldable stoppers inside between a non-use position in which they fit inside the respective supports, enabling them to be folded, and a use position, in which they protrude, and are positioned vertically in front with a defined protuberance at the base, preventing the mentioned supports from being folded.

These foldable stoppers are linked to actuating cables to position them in the protruding, use position, once the supports are unfolded.

DESCRIPTION OF DIAGRAMS

To complete the description and facilitate understanding of the different features of the invention, the present descriptive report includes a set of illustrative but not limiting diagrams in which the following can be seen:

Figure 5:
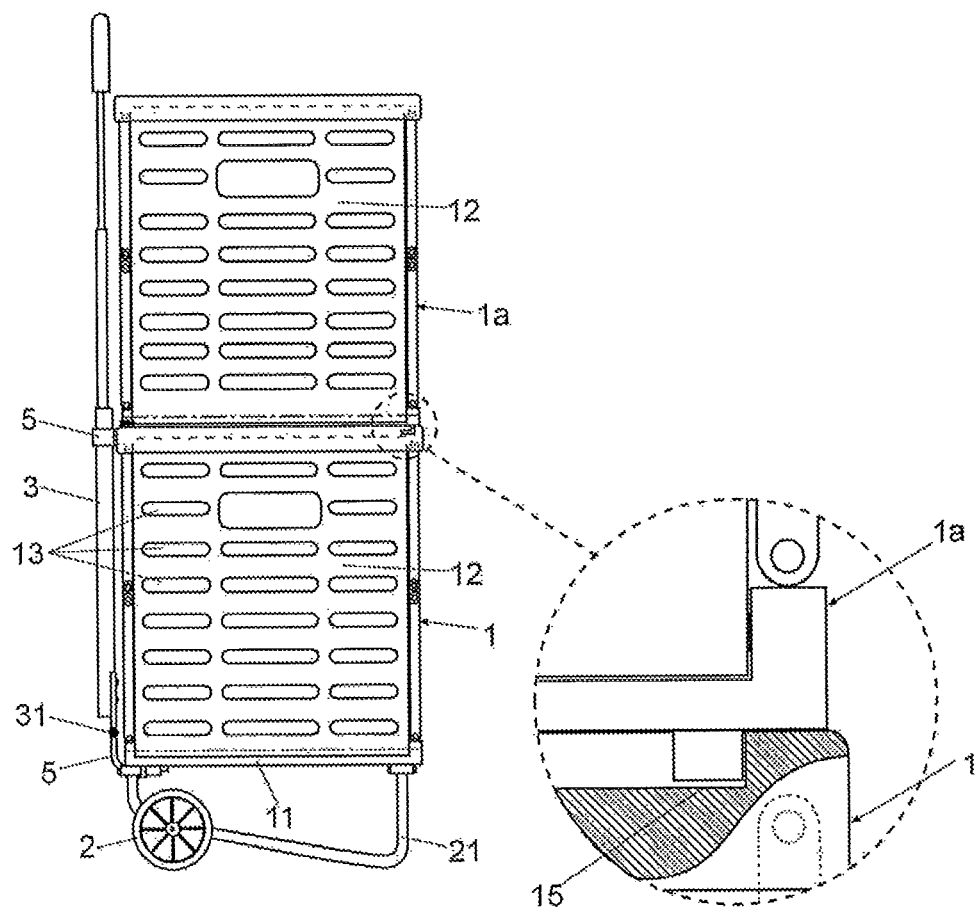

FIG. 5 shows a side view of the device in the previous figures in a folded-out position, and in which an additional case arranged on the folding case can be seen. In this specific example of use, the additional case does not have wheels or a handle. This figure also shows an enlarged view of the area where the additional case fits onto the foldable case. This detail is sectioned partially to show clearly the hooks to fix the cover and the ledges on which the additional case is supported.

Figure 6:
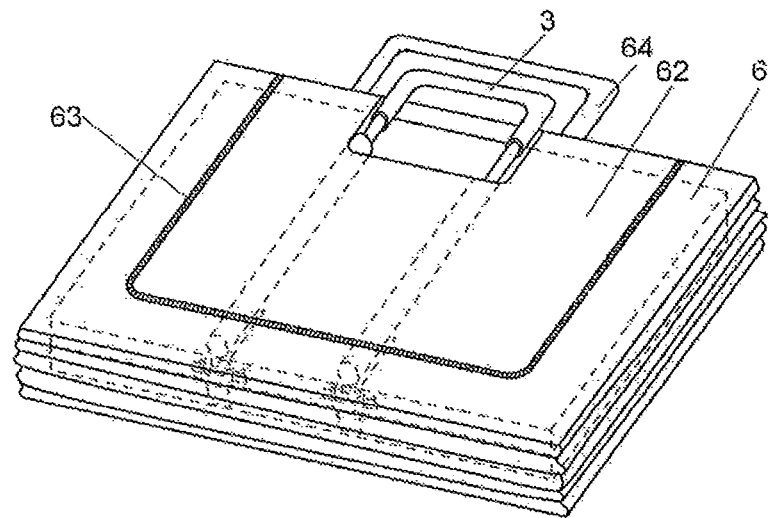

FIG. 6 shows a view in perspective of the case in a folded position covered by the cover which, in this variation of use, has a handle to grip and a flap or central part with a zip.

Figure 7:
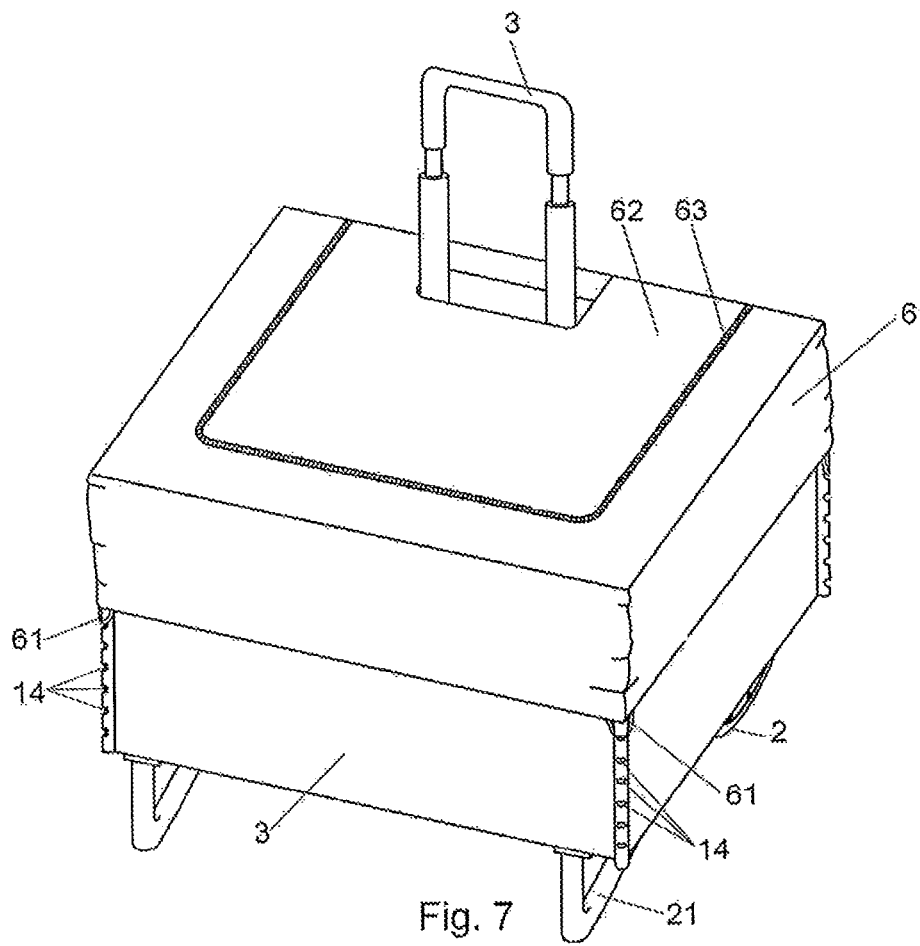

FIG. 7 shows a view in perspective of the folded-out case with the cover shown in the previous figure in a closed position.

Figure 8:
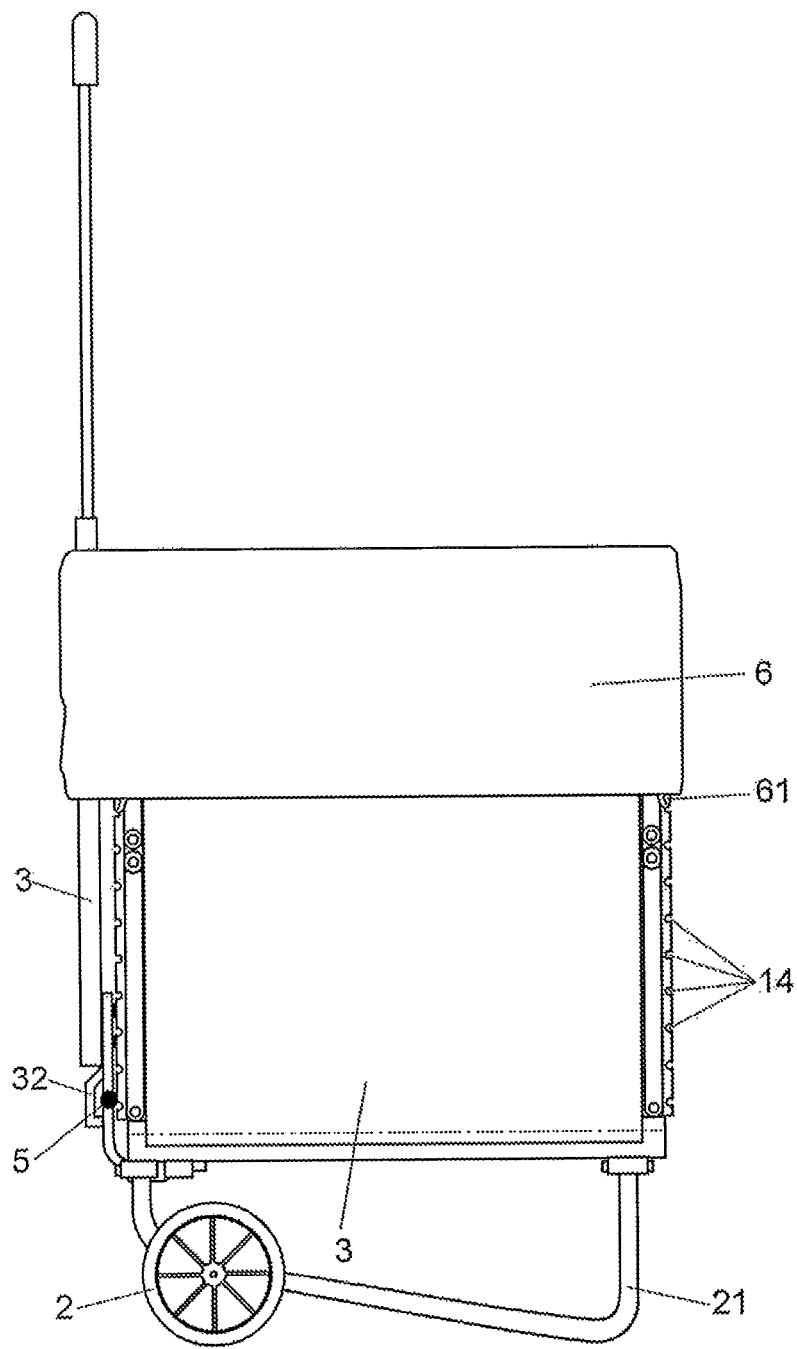

FIG. 8 shows a variation of use for the handle, with a foldable stopper provided in the lower part of the device in a use position.

Figure 9:
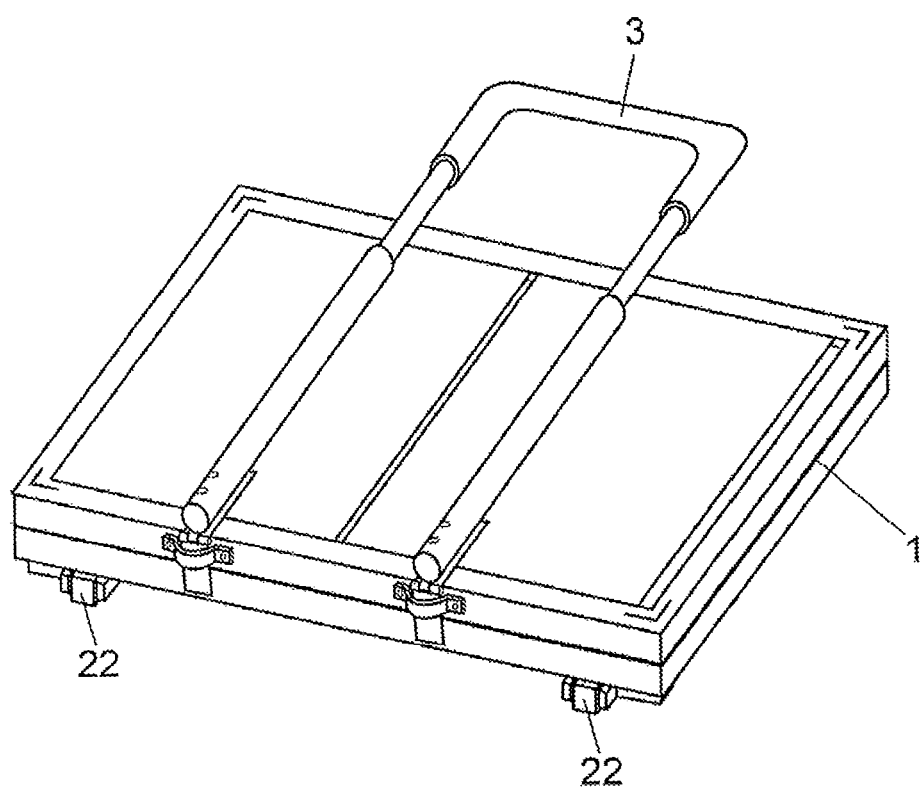

FIG. 9 shows a view in perspective of a variation of use for the handle, presenting a "U" form.

Figure 10:
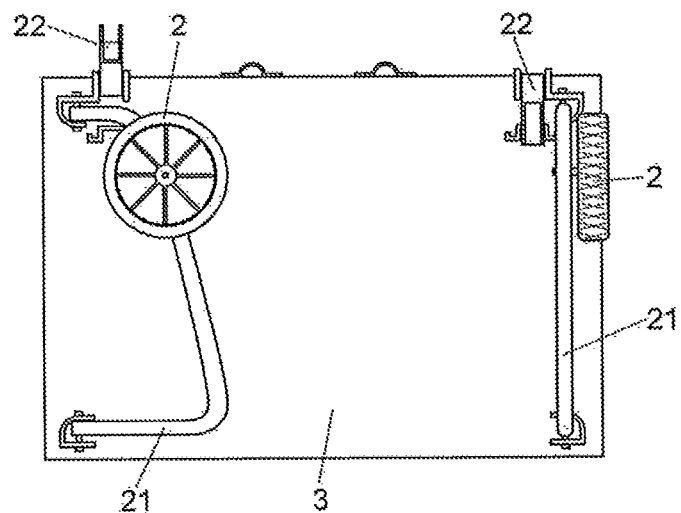

FIG. 10 shows a view of the bottom of the case, in which the foldable wheels can be observed. One of the wheels is shown in a use position and the other is shown in a folded, non-use position.

Figure 11:
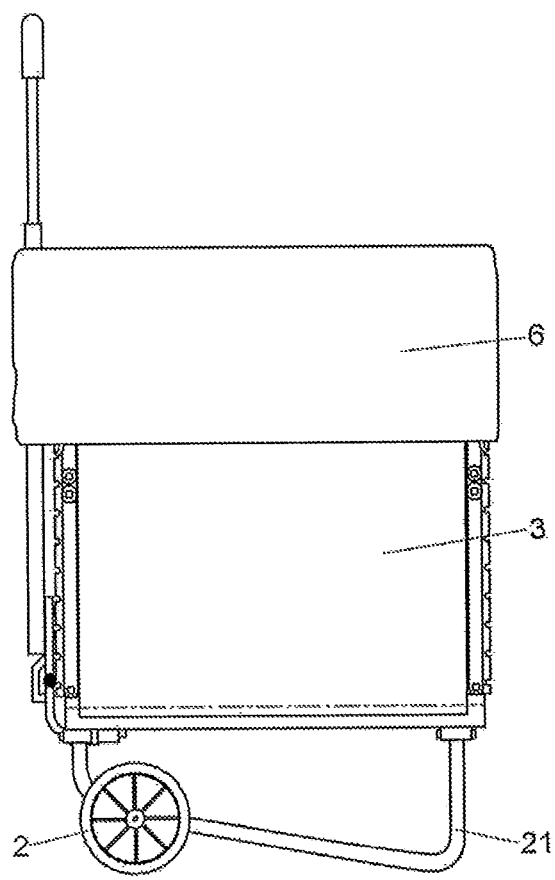

FIG. 11 shows a view of the case from above with the foldable wheels in a use position.

Figure 12:
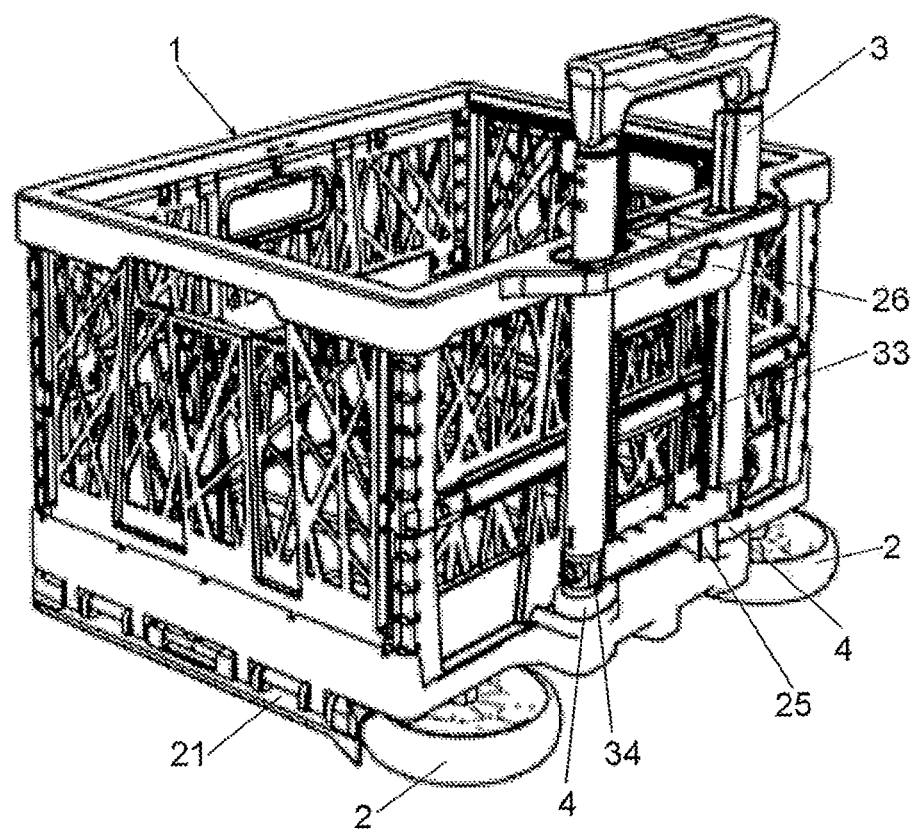

FIG. 12 shows a view in perspective of a variation of use for the device comprising means for actuating the foldable supports of the wheels by cable, and in which the device is shown with the wheels folded in a non-use position with the handles folded away.

Figure 13:
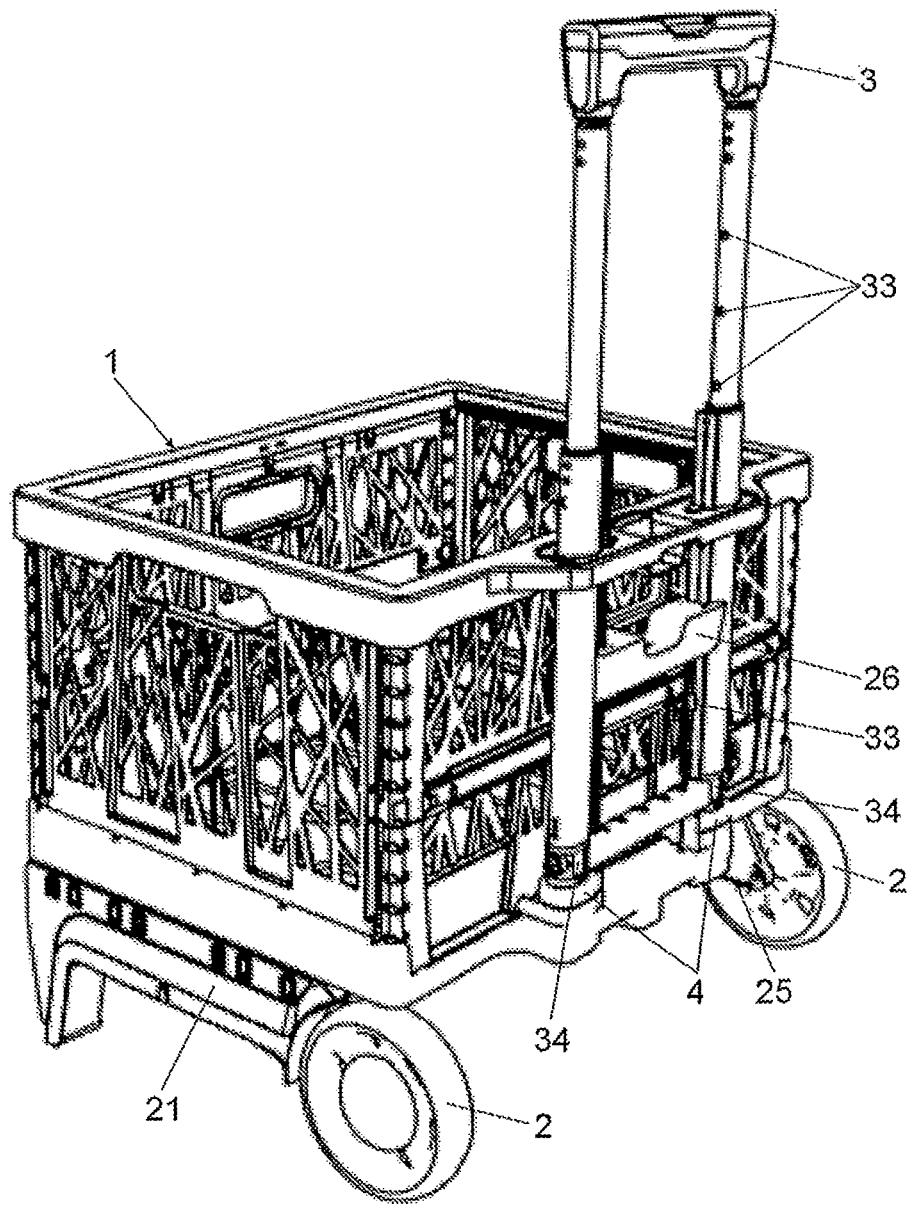

FIG. 13 shows a view in perspective of the device in FIG. 11 in the use position.

Figure 14:
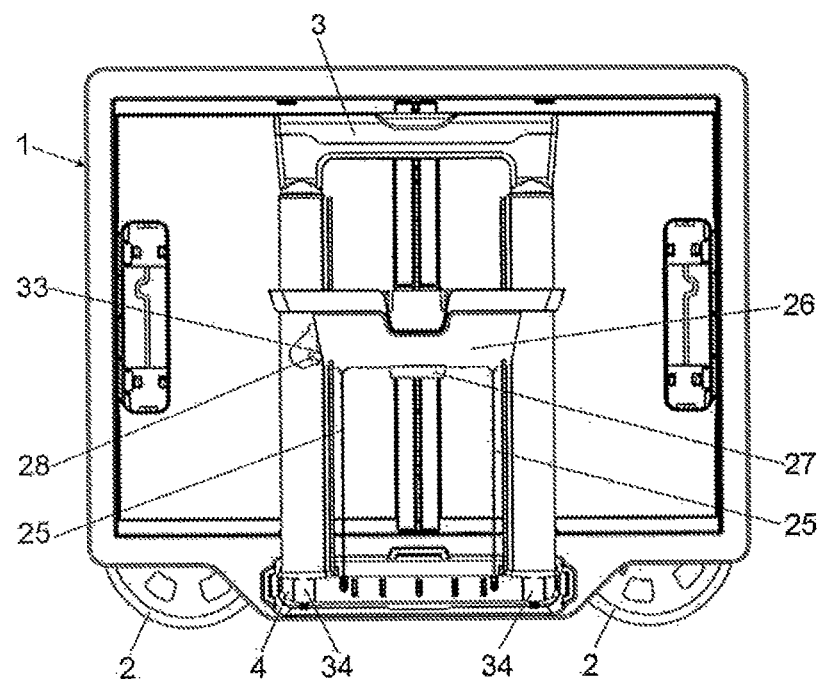

FIG. 14 shows a schematic view of the top of the device shown in previous figures, totally folded and partially sectioned to show the side pieces retaining the actuator.

Figure 15:
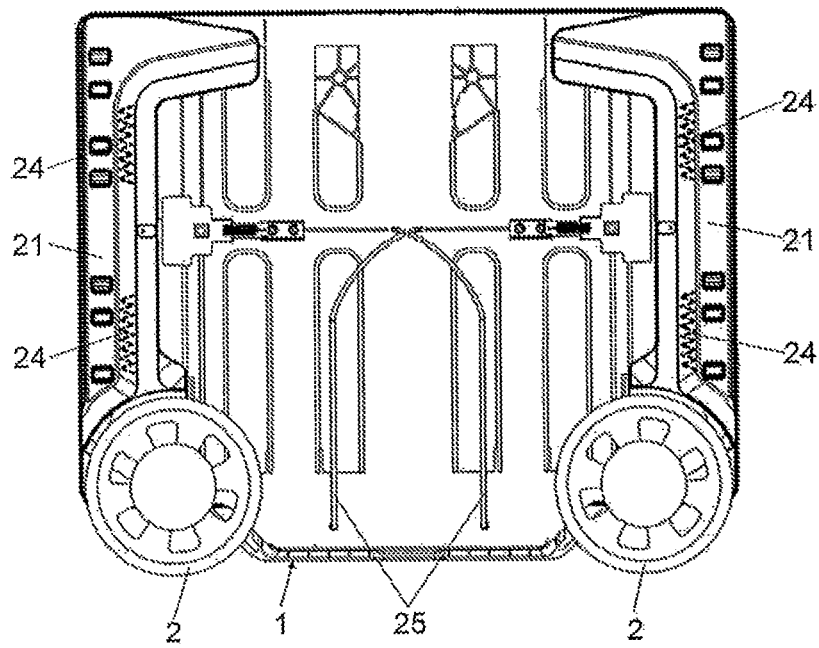

FIG. 15 shows a view of the bottom of the device, totally folded and showing the actuating cables for the foldable supports of the wheels.

Figure 16:
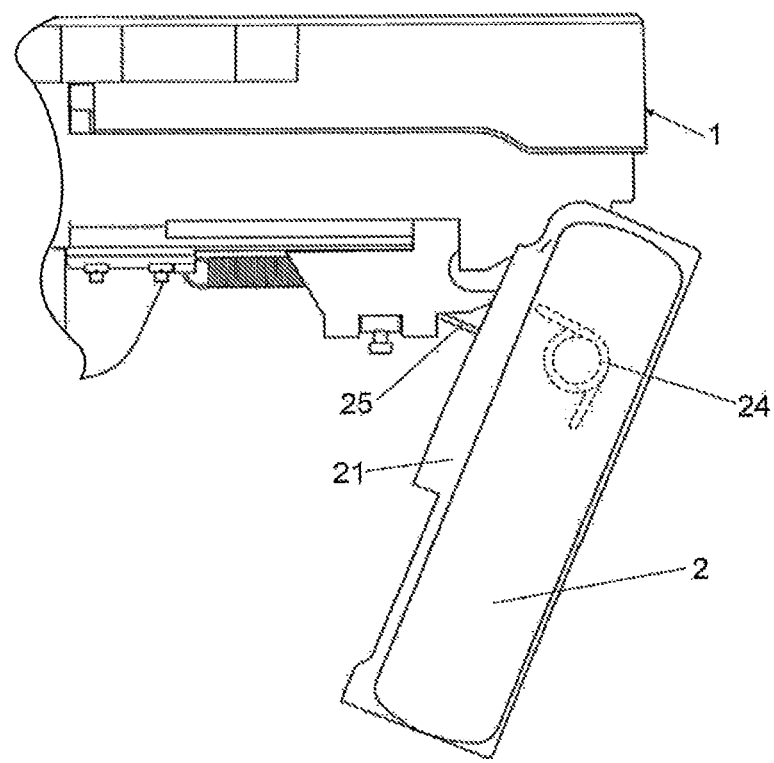

FIG. 16 shows a partial view from above and behind the device, in which one of the foldable supports for the wheels can be seen in an intermediate foldaway position, and in which a discontinuous line shows the springs which maintain it in a use position.

Figure 17:
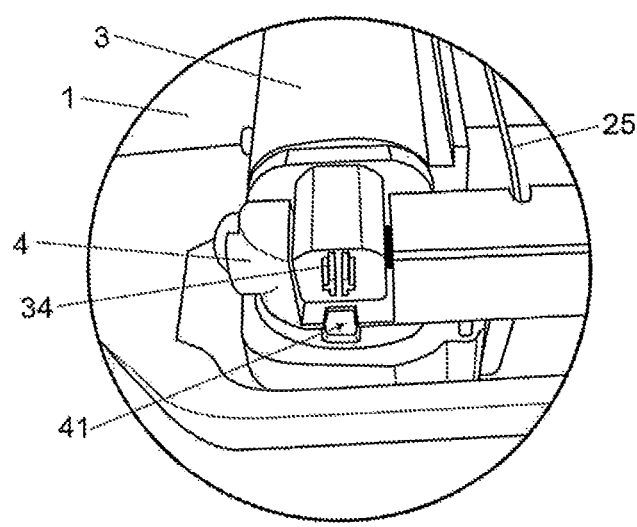

FIG. 17 shows detail of a variation of use for the bottom of the handle providing anchorage to retain the handle in a use position.

Figure 18:
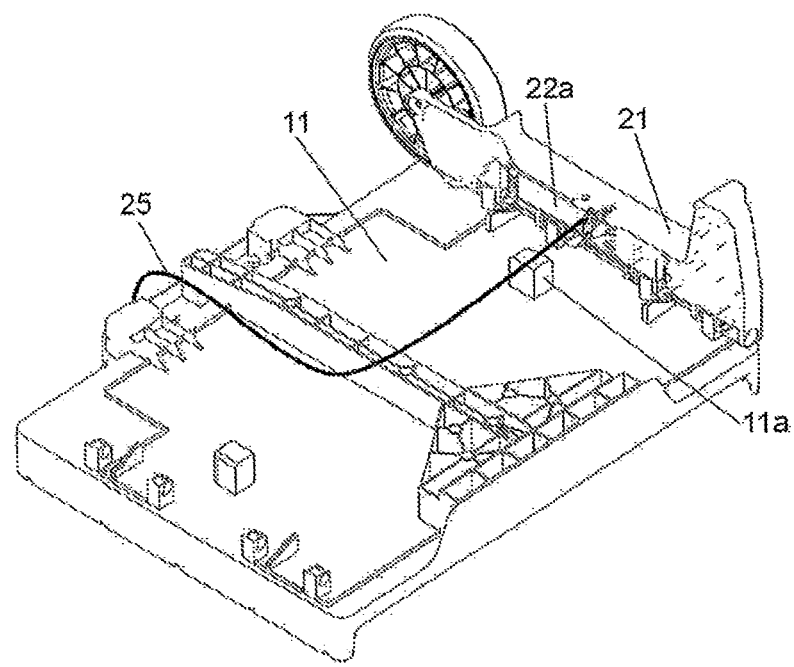

FIG. 18 shows detail in perspective of the bottom of one of the supports for the wheels mounted on the base in a folded-out position. A variation for use can be seen for the foldable stoppers to retain the support for the wheels in a folded-out position, in which the stopper in question is shown in a non-use position.

Figure 19:
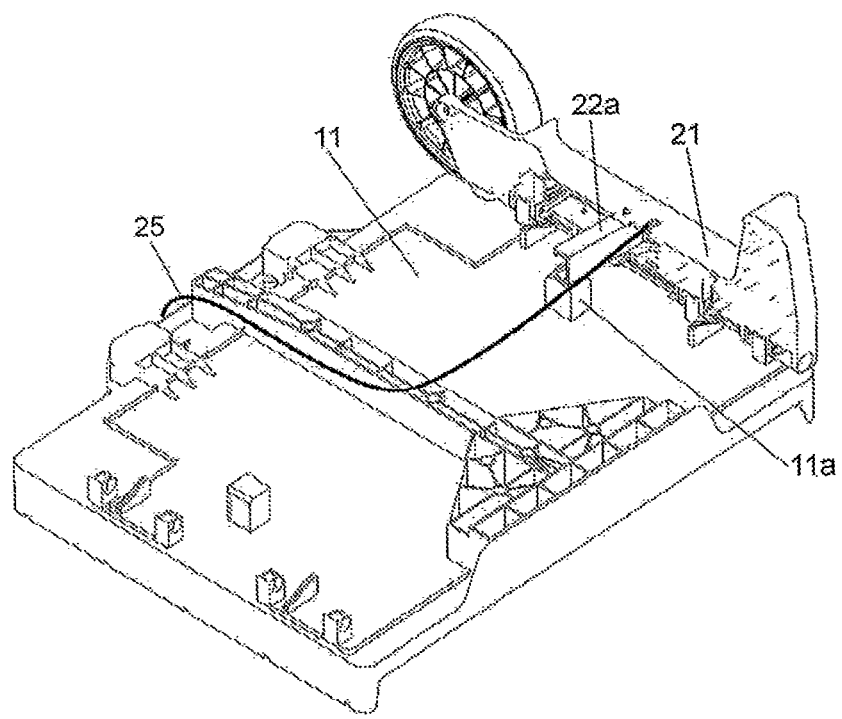

FIG. 19 shows a similar view to FIG. 18, with the foldable stopper in a protruding, use position in front of a protruding part of the base, to prevent the wheel support folding.

PREFERRED SETUP OF THE INVENTION

In the example of use shown in the figures attached, the device comprises a foldable case (1) provided with folding side wheels (2) and a foldable, telescopic handle (3) for transporting the device in the unfolded, use position.

Figure 1:
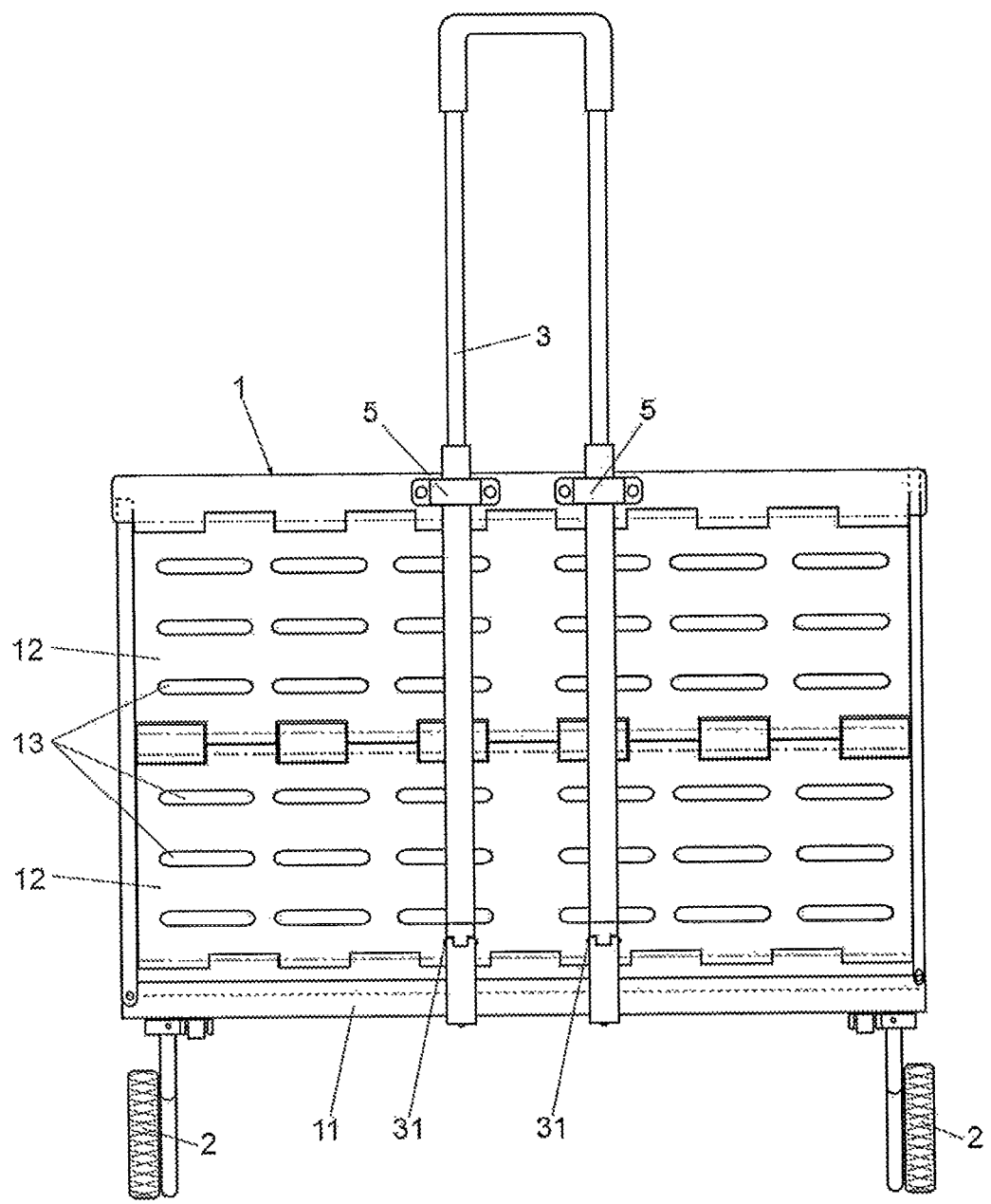
FIG. 1 shows a front view from above of an example of use for the device of the invention in a folded-out or use position, and in which the panels of the base present holes or grooves to make it lightweight.
Figure 2:
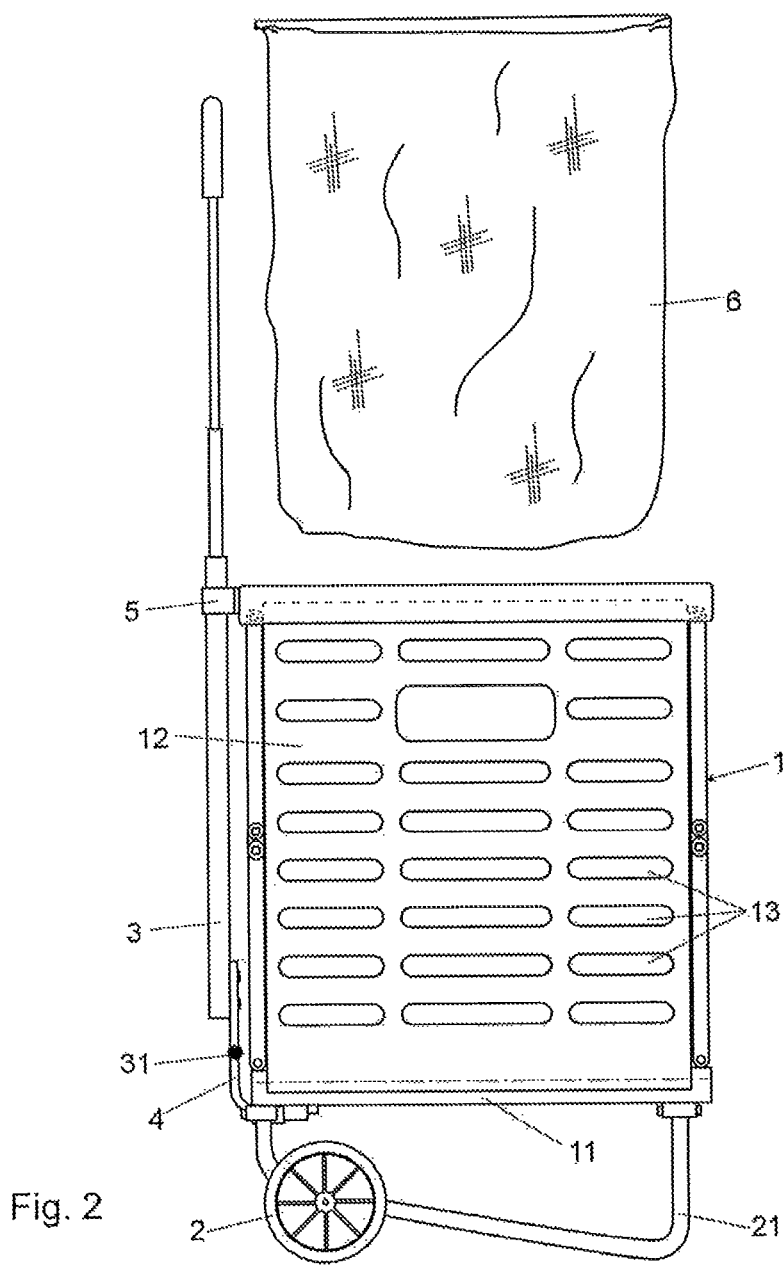
FIG. 2 shows a side view of the device in a folded-out position and the cover.
Figure 3:
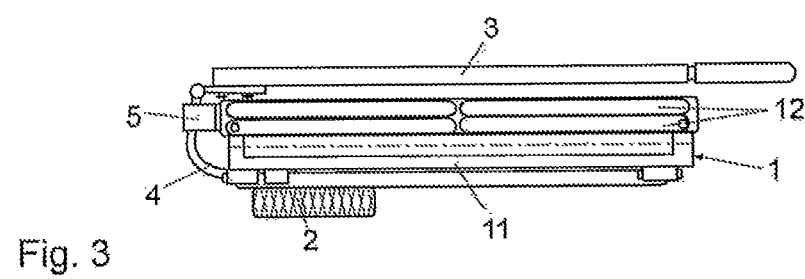
FIG. 3 shows a side view of the device in a folded position.
Figure 4:
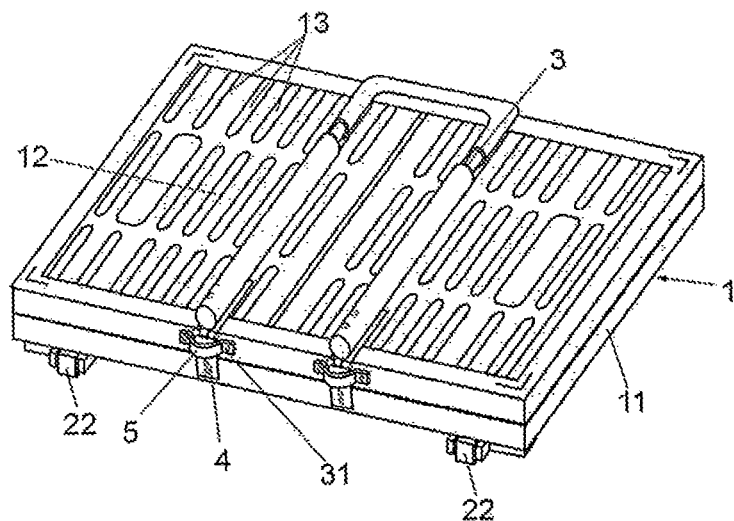
FIG. 4 shows a view in perspective of the device in the same folded position as the previous figure.

The case (2) comprises a base (11) and panels (12) which can be used between a folded-up position, as shown in FIGS. 3 and 4, in which they are positioned in parallel on top of the base (11) and an unfolded position, shown in FIGS. 1, 2 and 5, in which they are arranged substantially vertically, defining with the base (11) a cavity in which shopping can be placed.

The telescopic handle (3) is mounted by means of a hinge system (31) on a support part (4) solidly connected to the base (11). This hinge system (31) can be used to move the handle (3) between a non-use position in which it is arranged substantially horizontally on the folded-up case (1), as shown in FIGS. 3 and 4, and a use position in which it is arranged substantially vertically on the front side of the unfolded box, as shown in FIGS. 1, 2 and 5.

As shown in FIGS. 3 and 4, the length of the supporting part (4) is greater than the height of the case in the folded-up position, enabling the handle to be arranged horizontally on top of the folded-up case (1).

In the example shown, the upper area of the front panel (12) has a bridge section (5) which defines where the telescopic handle (3) passes through comfortably.

The bridge section (5) automatically guides the handle (3) between the non-use and use positions when the case (1) is folded and unfolded.

In the example of use shown in the figures attached, the panels (12) of the case present holes or grooves (13) to make it more lightweight and indentations or hooks (14) at different heights to fit and adjust a cover (6) on the foldable case (1) using straps (61) to support the cover (6).

As can be seen in FIG. 5, the case presents ledges on the top on which an additional foldable case (1a) can be supported and placed. This makes it possible to increase the capacity of the device, as shown in FIG. 5. However, as previously mentioned, the panels of the case can be continual, without the aforementioned holes or grooves and can be made from lightweight, resistant material, such as Polycarbonate.

The additional case (1a) presents a similar shape to the foldable case (1). In the example shown, the additional case does not have wheels or a handle, although, as previously mentioned, it could have these same elements as the lower case.

In the example shown in FIG. 8, the foldable handle (3) presents a stopper (32) at the bottom in the use position, which prevents the handle exceeding this position when the case is unfolded.

In the example shown in FIG. 9, the handle (3) presents an inverted "U" shape with parallel extendible arms.

In the examples of use shown in FIGS. 1 to 9, the wheels (2) are mounted directly on the base (11) of the case, and are permanently maintained in a use position, while, in the variation of use shown in FIGS. 10 and 11, the wheels (2) are foldable in order to reduce the space occupied by the case in a folded-up, non-use position. In this example of use, the base (11) of the case comprises two lower platforms (21) which have supports (22) carrying the wheels (2), which are able to move between a use position, substantially vertically, and a non-use position in which they are arranged folded horizontally on the base (11) of the case.

Each of the platforms (21) comprises foldable stoppers (23) to retain the supports (22) carrying the wheels (2) in a use position.

In the example of use shown in FIGS. 12 to 16, the supports (21) of the wheels (2) are linked to springs (24) which maintain them in a use position, substantially vertically, and actuating cables (25) fixed to a manual actuator (26) mounted so that it can move between the lower part of the handle (3) to fold the supports (21) into the non-use position.

The actuator (26) has a button (27) which acts on retractable pieces (28) designed to fit into holes (33) defined in the handle (3) to fix the actuator (26) in the non-use position of the supports (21).

In the variation of use shown in FIG. 17, the foldable handle (3) presents appendages (34) in the lower part which fit into holes (41) defined in the support pieces (4) forming anchorage to retain the handle (3) in a use position.

In the variation of use shown in FIGS. 18 and 19, the supports (21) for the wheels (2) have foldable stoppers (22a) on the side panels, to move between a non-use position in which the respective supports (21) are stored, enabling them to be folded-up, and a use position in which they protrude and are arranged vertically with a protuberance (11a) defined in the base (11), preventing the supports (21) folding up.

These foldable stoppers (22a) are linked to actuating cables (25) to be arranged in the protruding use position once the supports (21) are unfolded.

Having described in sufficient detail the nature of the invention, and provided an example of preferential use, it is stated for relevant purposes that the materials, shape, size and arrangement of the elements described can be modified, as long as they do not suppose an alteration of the essential features of the invention which are outlined below.

The invention claimed is:

1. A device for transporting shopping; comprising:
a foldable case provided with a base with at least two folding side wheels for supporting and moving same and side panels which can be moved between a folded-up position, in which the panels are positioned in parallel on top of the base, and an unfolded position, in which the panels are arranged substantially vertically, forming together with the base a cavity in which shopping can be placed; and a telescopic handle which is mounted on a support part that is connected to the base by means of a hinge system which can be used to move the handle between a non-use position, in which the handle is arranged substantially horizontally on the fold-up case, and a use position in which the telescopic handle is arranged substantially vertically on the front side of the unfolded box, wherein the side panels include a front panel which has a bridge section fixed to an upper area thereof and the telescopic handle is positioned to go through the bridge section for guiding the handle between the use and non-use positions, wherein in the non-use position, the handle is disposed remotely from and free of the bridge section and lies in a different plane relative to a plane that contains the bridge section that is disposed along the upper area of the front panel.

2. Device, according to claim 1, wherein the supporting piece of the handle is longer than the height of the box in the folded-up position, meaning that the handle is positioned horizontally on the folded-up case.

3. Device, according to claim 1, wherein the supporting piece is defined in the base of the foldable case.

4. Device, according to claim 1, wherein the telescopic handle presents a "U" shape with two parallel arms.

5. Device, according to claim 1, wherein the telescopic handle has in the lower part at least one stopper to be used in the use position.

6. Device, according to claim 1, wherein the foldable panels of the case have holes or grooves to make it more lightweight.

7. Device, according to claim 1, wherein the case has grooves or hooks at different heights on the side, to place and adjust a cover for the foldable case by means of straps to support the cover.

8. Device, according to claim 7, wherein the cover comprises a handle to grip and for transporting.

9. Device, according to claim 7, wherein the cover has a flap or section with a zip for closing the cover.

10. Device, according to claim 1, wherein the panels of the case have ledges on the lower side on which an additional case can be supported and placed in an unfolded position.

11. Device, according to claim 10, wherein the additional case has a similar shape to the foldable case.

12. Device, according to any of the claim 10, wherein the additional case has a similar shape to the foldable case and does not have wheels or a handle for transporting it.

13. Device, according to any of the claim 1, wherein the base of the case comprises supports at the bottom, carrying wheels which can be used between a use position, substantially vertically, and a non-use position in which they are folded horizontally on the base of the case.

14. A device for transporting shopping comprising:
a foldable case provided with a base with at least two folding side wheels for supporting and moving same and side panels which can be moved between a folded-up position, in which the panels are positioned in parallel on top of the base, and an unfolded position, in which the panels are arranged substantially vertically, forming together with the base a cavity in which shopping can be placed; and a telescopic handle which is mounted on a support part that is connected to the base by means of a hinge system which can be used to move the handle between a non-use position, in which the handle is arranged substantially horizontally on the fold-up case, and a use position in which the telescopic handle is arranged substantially vertically on the front side of the unfolded box, wherein the base of the case comprises supports at the bottom, carrying wheels which can be used between a use position, substantially vertically, and a non-use position in which they are folded horizontally on the base of the case, wherein the base includes foldable stoppers to retain the supports carrying the wheels in a use position.

15. A device for transporting shopping comprising:
a foldable case provided with a base with at least two folding side wheels for supporting and moving same and side panels which can be moved between a folded-up position, in which the panels are positioned in parallel on top of the base, and an unfolded position, in which the panels are arranged substantially vertically, forming together with the base a cavity in which shopping can be placed; and a telescopic handle which is mounted on a support part that is connected to the base by means of a hinge system which can be used to move the handle between a non-use position, in which the handle is arranged substantially horizontally on the fold-up case, and a use position in which the telescopic handle is arranged substantially vertically on the front side of the unfolded box, wherein the base of the case comprises supports at the bottom, carrying wheels which can be used between a use position, substantially vertically, and a non-use position in which they are folded horizontally on the base of the case, wherein the supports of the wheels are linked to springs which maintain them in a use position, substantially vertically, and actuating cables connected to a manual actuator mounted so that it can move across the lower part of the handle to fold the supports into a non-use position.

16. Device, according to claim 15, wherein the actuator has a button which acts on retractable pieces designed to fit into holes defined in the handle to fix the actuator into the non-use position of the supports.

17. Device, according to any of the claim 1, wherein the telescopic handle presents appendages on the lower part which fit into holes defined in the support pieces which form anchorage to retain the handle in a use position.

18. A device for transporting shopping comprising:
a foldable case provided with a base with at least two folding side wheels for supporting and moving same and side panels which can be moved between a folded-up position, in which the panels are positioned in parallel on top of the base, and an unfolded position, in which the panels are arranged substantially vertically, forming together with the base a cavity in which shopping can be placed; and a telescopic handle which is mounted on a support part that is connected to the base by means of a hinge system which can be used to move the handle between a non-use position, in which the handle is arranged substantially horizontally on the fold-up case, and a use position in which the telescopic handle is arranged substantially vertically on the front side of the unfolded box, wherein the base of the case comprises supports at the bottom, carrying wheels which can be used between a use position, substantially vertically, and a non-use position in which they are folded horizontally on the base of the case, wherein the supports of the wheels have foldable stoppers inside, between a non-use position in which they are stored in the interior of the respective supports, enabling the supports to be folded, and a use position, in which they protrude and are arranged vertically in front with a protuberance defined in the base, preventing the supports from folding.

19. Device, according to claim 18, wherein the foldable stoppers are linked to actuating cables to position them in the protruding, use position once the supports are unfolded.

* * * * *